Feb. 2, 1932. E. J. WELCH 1,843,637
COLLAPSIBLE TRIM AND DRIP MOLDING
Filed July 19, 1929
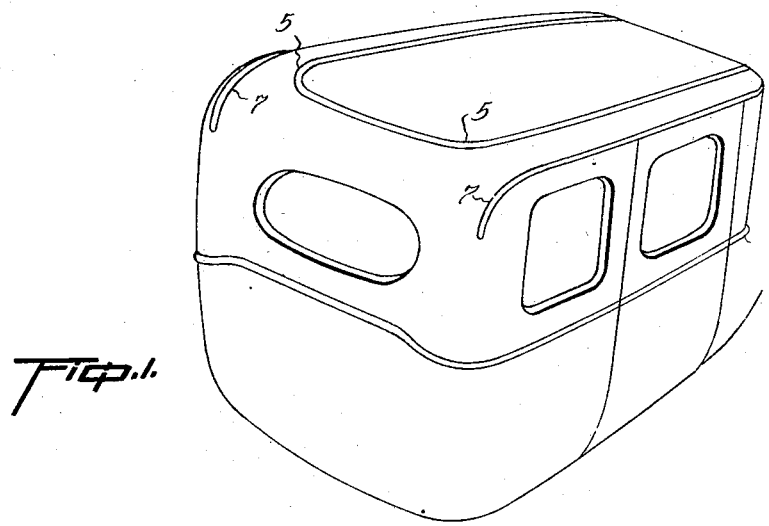
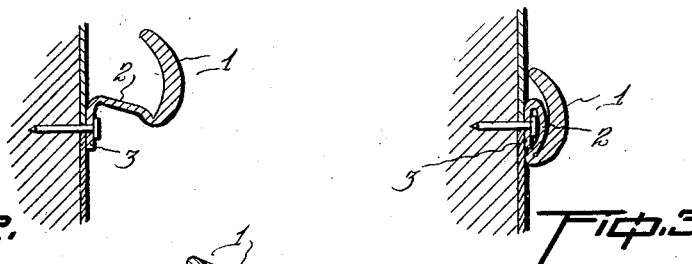
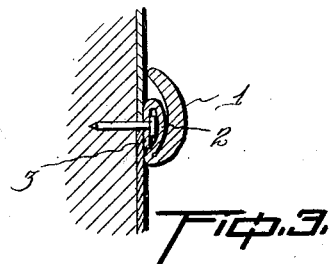
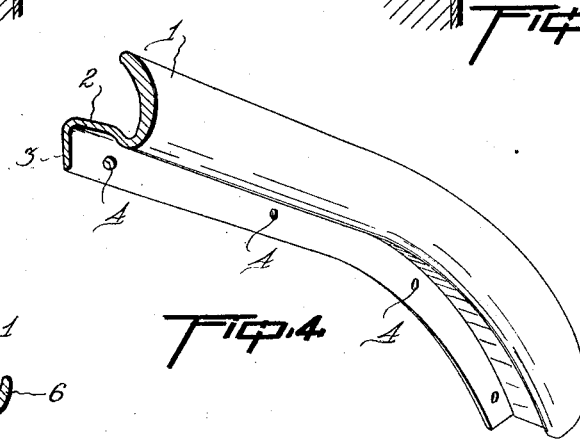
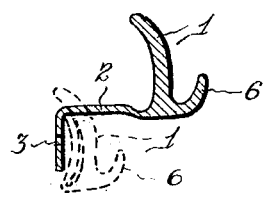
INVENTOR
Edward J. Welch
BY
ATTORNEYS Patented Feb. 2, 1932

1,843,637

UNITED STATES PATENT OFFICE

EDWARD J. WELCH, OF NEW YORK, N. Y.

COLLAPSIBLE TRIM AND DRIP MOLDING

Application filed July 19, 1929. Serial No. 379,348.

This invention relates to a molding and more particularly to metal moldings especially adapted for use in trimming automobile bodies.

An object of the invention is to provide a molding which may be readily secured in place and then folded to cover and obscure the securing means. It is also an object to provide a molding of this character which is so constructed that it may be bent or curved laterally as it is applied to the body, with a true radius and without the formation in such bending, of kinks or deformations which would detract from its appearance when in place. A further object is to provide a one piece molding formed with a securing flange which is exposed in the construction of molding as supplied by the mill, so that it may be readily secured in place with proper alignment, upon the vehicle body, this flange being connected with the body of the molding proper, in such a manner that after the molding is secured in place, it may be collapsed and the body brought into firm contact with the surface of the vehicle body to which it is applied, and completely enclosing the flange, securing means and the portion connecting the flange and body of the molding. The object of this portion connecting the flange and body of the molding, is to bring the parts into such relative positions that the molding may be bent laterally in applying it to the vehicle body without collapsing or otherwise deforming the molding, and the molding, after being secured in place, may be collapsed or depressed into firm contact with the vehicle body surface, and because of the manner in which it is secured to the vehicle body, will remain in firm contact with the surface to which it is applied and will have the appearance of a solid molding, except that the fastening means will be concealed.

A further object is to provide a one piece molding which may be readily extruded or otherwise formed in the usual manner of manufacturing metal moldings, and the construction of which is such as to greatly facilitate its application to a motor vehicle body. A further object is to provide certain other new and useful features in the construction, the invention residing in the several matters hereinafter set forth and more particularly pointed out in the appended claims, reference being had to the accompanying drawings in which—

Figure 1 is a perspective view of a motor vehicle body, illustrating the application of a molding thereto embodying the present invention;

Fig. 2 is a cross sectional detail of the molding, illustrating the manner in which it is applied;

Fig. 3 is a similar cross sectional detail showing the finished molding as applied to a motor vehicle body;

Fig. 4 is a perspective view of a length of molding before application to a vehicle body, the molding being shown in extended position ready for application and bent or curved laterally to illustrate the manner in which this molding may be bent or formed to conform to the desired curves of the vehicle body and to add to its appearance when applied; and Fig. 5 is a cross sectional view of a modified form in which the molding body is provided with a channel or drip trough for carrying away water from the top of the vehicle body.

This molding as shown in the accompanying drawings, comprises a body portion, or that portion which forms the molding proper, said body 1 being curved transversely, thus providing a molding which is convexo-concave, the outer surface being curved from edge to edge thereto to give the apperance of an ordinary plain molding, and the under or inner surface of which is concaved to form a recess for the reception of the securing portions of the molding and the securing means therefor, the width of the body being greater than the width of the securing and connecting flanges so that, when in collapsed positions, the edges of the body will firmly engage the surface to which the molding is applied and completely enclose and conceal from view, the securing means.

Integral with one edge of the body 1 is a connecting flange or strip 2, the edge portion of which is bent at substantially right angles to the portion 2, to form a securing flange 3, spaced from the body 1 and projecting laterally thereof so that the molding, as it comes from the factory, will have an exposed flange 3 provided with openings 4 for the securing of the molding firmly in place upon the surface of the vehicle body to which it is to be applied. The connecting or intermediate portion 2 serves to space the body 1 from the flange 3 while holding it in a position to collapse or fold toward and over the flange 3 in the final operation of applying the molding to the vehicle body. This connecting portion 2 also permits of the positioning of the body 1 relative to the flange 3 so that the entire molding may be bent laterally of the body 1 to give it the desired curvature, as when the molding is applied to the top of the vehicle body as illustrated at 5 in Fig. 1, thus permitting the use of a continuous strip of molding extending from front to rear of the top or roof of the body and across the rear end, the longitudinal portions or straight runs being connected by the curved portions. This lateral bending or curving of the molding without having kinks or sharp bends therein is permitted by reason of the formation of the body 1 and the flange 3 in parallel planes extending in the direction of the width of these parts, and connecting these parts by a connecting portion or strip extending in the plane of its width, at substantially right angles to the planes of the width of the body and flange. The body 1 may be bent upon a true radius in a direction laterally of its width without distorting or deforming the body, and as the flange 3 is comparatively thin, it may also be curved in a like manner, the connecting portion 2 offering little resistance to this lateral bending due to its position at substantially right angles to the width of the body and flange. If the body 1 be positioned substantially at right angles to the flange 3, this would prevent the bending of the body laterally of the direction of its length because of the concavo-convex form of the body 1 which would be distorted if bent in any direction other than in the direction of its width, and such bending could not be accomplished without causing a collapse of the molding, that is, a folding of the securing flange toward the body and such collapse would prevent the insertion of the fastening means through the flange in securing the molding to the vehicle body. Where the molding body and its securing flange are positioned in substantially parallel relation in the direction of their width, then both may be bent laterally to a true curve before application to the vehicle body, and the molding then nailed in place by nails passing through the securing flange in accurate position upon the vehicle body. After so securing the molding in place, the connecting strip 2 provides an accurate guide in collapsing the molding, and when so collaped or pressed toward the surface of the vehicle body, said strip forms a firm connection between the body and the flange, and folds up within the concave side of the body where it is concealed from view, the body being sufficiently concave and of a width to span both the flange and connecting strip with its edges in firm contact with the surface of the vehicle body.

Metal moldings of this character are usually formed from a comparatively soft metal by the extruding method and because of the nature of the metal, it may be bent with little difficulty, but when the present molding is collapsed or formed down firmly against the surface of the vehicle body, the tendency of this metal is to stay in the position into which it is bent, and firmly hold the edges of the body 1 in contact with the surface to which molding is applied.

In Fig. 5 a molding of a slightly modified construction is shown, this modification consisting in forming the body 1 with an outstanding lip or flange 6 along one edge, which lip is curved upwardly to provide a drip channel or trough. Otherwise the construction of the molding is identical with the construction shown in the other figures of the drawings, and it will be noted that this drip trough molding may also be bent laterally as indicated at 7 in Fig. 1 to conform to the curvature of the surface of the vehicle body adjacent the rear end thereof, said drip trough molding being applied in the usual manner at each side of the roof above the side windows in the body.

Obviously the body 1 of the molding may be formed with any desired external surface configuration and other changes within the scope of the appended claims are contemplated.

Having thus fully described my invention, what I claim is:—

1. A metal molding comprising a body portion formed with a concave inner side, a securing flange of lesser width than said body, and a connecting portion integral with opposite edge portions of said body and flange and of less width than the width of said body, said connecting portion arranged to bend adjacent its lines of connection with said flange and body.

2. A metal molding comprising a body portion, a securing flange, and a connecting portion integral with opposite edges of said body and flange and arranged to offset said flange relative to said body in both horizontal and vertical planes of said body.

3. A metal molding comprising a body having a concave inner side, a securing flange and a connecting portion integral with one edge portion of said body and extending laterally from the concave side of said body, said connecting portion being integral at its opposite edge with one edge of said flange with said flange extending, in the direction of its width, beyond the edge of said body with which said connecting portion is formed integral, said connecting portion being bendable along its lines of connection with said flange and body.

4. A metal molding comprising a body portion formed with a concave inner side, a securing flange, and a connecting portion integral along its edges with said flange and body, said body extending laterally from one edge of said connecting portion in one direction and said flange extending laterally from the other edge of said connecting portion in an opposite direction, said connecting portion being bendable along its lines of connection with said flange and body to fold over said flange with said body folded down upon said connecting portion and covering the same and said flange with the edges of said body in contact with the surface to which the molding is applied.

5. A metal molding comprising a body portion, a securing flange of lesser width than said body, and a connecting portion integral with opposite edge portions of said body and flange, said connecting portion being of less width than said body and of greater width than said flange, said connecting portion being arranged to bend at its lines of connection with said flange and body.

6. A metal molding according to claim 5 in which said body portion is concave at its inner side and is of such size and concavity that when said connecting portion is folded against said flange and said concave body is folded over the two, the edges of the body will contact the surface to which the flange is secured.

7. A molding strip having a securing flange with a connecting flange extending therefrom at one edge at an angle thereto to leave an open channel for the insertion of nails through said securing flange, and a body portion extending at an angle from the connecting flange at the edge thereof opposite to that from which the securing flange extends, said body portion and securing flange extending in opposite directions from the connecting flange, said molding being of extruded metal whereby the parts will be maintained initially in the relation stated while the nails are being driven, the connecting flange being foldable upon the securing flange and the body portion being foldable upon and covering the folded connecting flange and the securing flange, said strip being substantially rigid in its initial open position, and being formed to fold, as stated, on pre-determined lines, substantially as described.

In testimony whereof I affix my signature.

EDWARD J. WELCH.